United States Patent [19]

Munday et al.

[11] Patent Number: 4,806,325

[45] Date of Patent: Feb. 21, 1989

[54] PROCESS FOR RECOVERING ELEMENTAL PHOSPHORUS AND A METAL CONCENTRATE FROM FERROPHOS

[75] Inventors: Theodore F. Munday, Kendall Park; Richard A. Mohr, Martinsville, both of N.J.

[73] Assignee: FMC Corporation, Philadelphia, Pa.

[21] Appl. No.: 219,963

[22] Filed: Jul. 14, 1988

[51] Int. Cl.[4] ............ C01B 25/01; C01B 25/02; C01B 25/04
[52] U.S. Cl. .................... 423/322; 423/323
[58] Field of Search ................ 423/322, 323

[56] References Cited

U.S. PATENT DOCUMENTS

| | | | |
|---|---|---|---|
| 1,518,019 | 12/1924 | Tolman | 423/323 |
| 3,257,196 | 6/1966 | Foex | 75/10 |
| 3,380,904 | 4/1968 | Goldberger | 423/322 |
| 3,586,613 | 6/1971 | Stewart | 204/67 |
| 3,679,363 | 7/1972 | Skrivan | 23/223 |
| 3,783,167 | 1/1974 | Tylko | 373/23 |
| 4,010,241 | 3/1977 | Mosse et al. | 423/322 |
| 4,148,628 | 4/1979 | Machida | 75/10 R |
| 4,394,162 | 7/1983 | Tylko | 75/10 R |
| 4,466,824 | 8/1984 | Gavin et al. | 373/22 |
| 4,504,307 | 3/1985 | Lugscheider et al. | 75/10 R |
| 4,519,835 | 5/1985 | Gauvin et al. | 75/10 R |
| 4,610,720 | 9/1986 | Schmidt et al. | 75/84 |

FOREIGN PATENT DOCUMENTS 957733 11/1974 Canada .
2079746 12/1971 France ................ 423/322
521222 1/1976 U.S.S.R. ............. 423/323

OTHER PUBLICATIONS

Chemical Abstracts, 90:202830Q "Studies on the Plasmochemical Conversion of Ferrophosphorus".
U.S. Bureau of Mines report "Processes for Recovering Vanadium From Western Phosphates".
Chemical Abstracts, vol. 78, 1973 (C.A. 46552v) "Dephosphorization of Ferrophosphorus".
Chemical Abstracts, vol. 96, 1982 (C.A. 96:201882v) "Study of the Thermal Dissociation of Iron-Phosphorus Alloys".
U.S. Bureau of Mines Letter to Mr. Eric Rau dated 7/7/64.

Primary Examiner—Gregory A. Heller
Attorney, Agent, or Firm—Frank Ianno; Richard E. Elden

[57] ABSTRACT

Ferrophos is treated in a plasma furnace by maintaining an electric arc between a cathode and at least one point on the surface of the ferrophos which serves as the anode in the presence of an inert plasma gas, maintaining the average temperature of the ferrophos at about 2,000° C. to about 2,700° C., evolving gaseous phosphorus from the ferrophos until it contains less than about 7% by weight phosphorus, removing a purified phosphorus gas as one product and a metal concentrate having a reduced phosphorus content as a coproduct.

22 Claims, No Drawings

PROCESS FOR RECOVERING ELEMENTAL PHOSPHORUS AND A METAL CONCENTRATE FROM FERROPHOS

This invention relates to a process for treating ferrophos in a plasma furnace to recover elemental phosphorus and a valuable metals concentrate, rich in vanadium, chromium and other metals, for example, nickel, molybdenum and titanium, having reduced amounts of phosphorus.

Ferrophos is a by-product of the electric furnace process for preparing phosphorus. In this process, a phosphate-bearing ore is charged to an electric furnace with silica and with a source of carbon, usually coke, until the furnace charge has been heated to a point where the phosphate-bearing ore yields elemental phosphorus. This is removed as a vapor and recovered along with carbon monoxide gas while from the base of the furnace an upper layer of slag and a lower layer of ferrophos are tapped from the furnace. The ferrophos is rich in phosphorus, containing as much as 27% phosphorus by weight and also containing sizeable amounts of metals such as vanadium and chromium. The exact amounts of these metals will depend upon the phosphate-bearing ore used in the furnace.

Heretofore, there has been no satisfactory method of recovering the phosphorus contained in the ferrophos. The high temperatures required to separate the phosphorus and the long time required for the phosphorus to be evolved would not permit practical recovery of phosphorus with conventional furnaces, that is, furnaces using combustion gases to heat the furnace or electric induction furnaces. The rate of phosphorus evolution was extremely slow and the amount of phosphorus that could be recovered, that is, the percentage of phosphorus recoverable from the ferrophos, was too low to be of practical interest. Accordingly, the phosphorus that remained in the ferrophos represented an economic loss and was responsible for a sizeable loss of phosphorus efficiency in the operation of the electric furnace.

In addition to the above, the inability to remove phosphorus from the ferrophos in substantial quantities resulted in another economic loss. The presence of phosphorus in sizeable amounts in the remaining metal concentrate, that is, the vanadium and/or chromium concentrate, renders these concentrates not readily usable in the steel industry and other such related industries where the vanadium and/or chromium would otherwise be valuable additives. The phosphorus content in quality iron and steel products has to be carefully limited, since even small quantities of phosphorus have a deleterious effect on the quality of most steel. The substantial amounts of phosphorus normally remaining in these concentrates is unacceptable because it deleteriously affects the quality of steel.

As a result of the above, it is desired to provide a process which will enable the recovery of phosphorus from ferrophos in a practical and economic manner and also which will reduce the level of phosphorus in the ferrophos to a level where its presence in the remaining metals concentrate recovered from the ferrophos does not deleteriously effect the use of such metals concentrate for iron and steel applications and the like.

It has now been found that elemental phosphorus and a metal concentrate low in phosphorus can be obtained from ferrophos by treating the ferrophos in a plasma arc furnace wherein an electric arc is maintained between a first electrode and ferrophos which serves as a second electrode, introducing a plasma gas inert to the phosphorus into the plasma arc furnace to form a continuous plasma within the arc maintained between the first electrode and at least one point on the surface of the ferrophos which serves as the second electrode, heating the ferrophos with a plasma arc to maintain the average temperature of the ferrophos at from about 2,000° C. to about 2,700° C., evolving gaseous phosphorus from heated ferrophos, reducing the phosphorus concentration of the treated ferrophos to less than about 7% by weight, removing a purified phosphorus gas from the furnace as one product, and recovering a metal concentrate having a reduced phosphorus content as a coproduct.

As an added feature of the invention, the average phosphorus vapor concentration in the plasma arc furnace is maintained sufficient to increase the normal voltage drop across the electrodes at any arc length, thereby permitting more power to be applied to the ferrophos at any given arc length.

In general, plasma arc systems fall into two categories, namely, nontransferred-arc and transferred-arc devices. In either device, the plasma arc is generated between at least two electrodes, one being an anode, and the other being a cathode. The plasma gas that is passed between the electrodes is a gas that is rendered electrically conductive by heating and by ionization of some of the atoms. The nontransferred-arc devices have what is sometimes termed "an internal anode" and "cathode" such as the dc jet arc, in which the plasma-forming gas is blown through a nozzle between a cathode and a water cooled anode in close proximity. The plasma emerges from the nozzle in the form of an expanding jet or tail flame at a very high velocity. In use, the device is placed near the work piece to be heated so that the plasma tail flame impinges on or is close to the work piece and transfers its heat to the work piece as required.

In the transferred-arc system, one of the electrodes, normally the anode, serves as the work piece and the plasma arc is struck between one electrode and the work piece with the plasma gas being introduced between the two. In this type of plasma generator, a long (normally DC) arc ranging from a few centimeters to a meter is struck between the cathode and an anode. The arc takes the form of a column of plasma gas at a high temperature. The temperature is highest near the tip of the cathode and decreases slowly as the anode is approached. The temperature near the cathode is extremely high and has been reported as being 20,000° K. when argon is used as the plasma.

In the practice of the present invention, the plasma arc furnace employed is of the transferred-arc type. Typical of such furnaces which may be employed are those described in U.S. Pat. No. 3,783,167 issued to Jozef K. Tylko on Jan. 1, 1974, and in U.S. Pat. No. 4,466,824 issued to William H. Gauvin and George W. Kaubanek on Aug. 21, 1984. The Tylko plasma furnace has an upper electrode capable of moving along its own longitudinal axis and forms the plasma arc with a lower stationary annular electrode. The upper electrode which can move about its own longitudinal axis is rotated at a given rate so that the plasma arc touches different locations in the collector, which is one species of the annular electrode, normally the anode, in the furnace.

The Gauvin et al plasma furnace utilizes a sleeve mounted in an annular relationship to the cathode and plasma arc so that feed material fed with the carrier gas against the inner wall of the sleeve melts under the heat energy radiated by the plasma arc and forms a molten mass of material on the inner surface of the sleeve wich results in a falling film of molten material flowing down the inner wall of the sleeve and dropping into a crucible beneath the sleeve where the plasma arc terminates.

In carrying out the present invention, a furnace having the transferred-arc device is employed. The upper electrode, which is normally the cathode is preferably water cooled to protect the cathode against excessive attack. Carbon electrodes, especially those having a hollow core, and without water cooling can also be used as cathodes to protect against overheating. The second electrode, which is normally the anode, is located at the base of the furnace and is connected to a receptacle in an electrically conductive manner. Preferably, the receptacle is a carbon vessel which can contain a heated melt and which is not deleteriously effected by the high heat present in the furnace.

After placing an electrical potential across the cathode and anode, an arc is struck between the two electrodes by moving the cathode down in proximity to or in contact with the anode. Often a small AC spark can be used to initiate the DC arc formation. At the same time, a plasma gas which is inert to phosphorus, such as argon, is passed down a sleeve surrounding the cathode so that it is introduced into the arc between the cathode and anode. At this point, the plasma gas ionizes and forms a plasma arc between the two electrodes which is both stable and continuous. The upper cathodic electrode is then moved vertically up until the length of the arc between the cathode and anode reaches a desirable working length.

In general, the length of the plasma arc is determined by the amount of power required to raise the temperature of the furnace, and the feed therein, to the desired temperature. The longer the arc, the greater is the power required to sustain the arc and which is available to heat the feed. However, it is not desired to have too long an arc because the longer the arc the greater is the heat loss by radiation along the extended length of the arc not in contact with the feed material.

Once the plasma arc has been established and its length fixed to desirable limits, the feed material is then fed continuously, or in batch, into the furnace. In general, the ferrophos feed is crushed and fed to the plasma furnace through a port in the furnace. In the case of the Gauvin et al furnace, the feed is fed through an orifice inside of the sleeve surrounding the plasma arc. In this way, the feed is heated and melts along the inside of the sleeve by virtue of heat absorbed from the upper portion of the plasma arc. It then drips down into the collector at the bottom of the furnace into which the plasma arc terminates. It then is heated directly by the plasma arc that contacts the surface of the molten feed.

In the Tylko apparatus, the ferrophos may be fed directly into the plasma arc where it is heated in its downward travel through the arc to the collector at the base of the furnace. The feed may also be fed continuously into the collector. Alternatively, the feed may be placed as a single charge into the collector at the base of the furnace where batch type processing is desired.

In either type of furnace, the plasma arc ends up terminating at at least one point on the surface of the molten ferrophos in the collector. As a result of the heat given off by the plasma arc extending between the cathode tip and the surface of the molten ferrophos, the temperature of the ferrophos can be increased until it reaches a temperature of from about 2,000° C. to about 2,700° C., preferably, from about 2,200° C. to about 2,300° C. While this represents the average temperature of the molten ferrophos in the collector, the temperature at the spot on surface of the ferrophos where the plasma arc contacts the ferrophos is much higher because the temperature of the ionized plasma gas in the core of the arc is at least 15,000° C., and transfers heat at this high temperature to that point on the surface of the ferrophos (termed the "anode spot") where the arc actually touches the ferrophos surface.

The transfer of heat at the anode spot is not only due to the high temperature of the ionized plasma gas, but also to the decay of the arc and the recombination of the ionized plasma gas which liberates the high energy required for ionization. This localized hot temperature at the anode spot causes the ferrophos to react vigorously and release elemental phosphorus from the ferrophos.

In this respect, the plasma furnace functions quite differently from other furnaces which rely on conventional heating techniques, that is, gas combustion or induction heating, to raise the temperature of feed to a uniform reaction temperature. The plasma furnace heats a portion of the ferrophos at the anode spot to a much higher temperature than the average temperature of the remainder of the melt, and this high temperature spot is believed to facilitate breakdown of the ferrophos into its component elements.

In this reaction, the ferrophos is decomposed to form elemental phosphorus and elemental iron. Similarly, vanadium phosphides and chromium phosphides in the melt are also converted to elemental vanadium and elemental chromium, respectively. The conditions in the furnace are essentially neutral; a reductive atmosphere is not necessary to carry out the instant reaction and an oxidizing atmosphere is not desired. vacuum in the furnace can be employed but has not been found necessary.

As phosphorus is evolved from the surface of the ferrophos, it accumulates in the furnace and enters the plasma arc. When sufficient phosphorus gas enters the plasma arc it causes an unexpected and heretofore unknown phenomenon. It increases the voltage drop across the plasma arc at any given arc length. Another way of expressing it is that the electrical resistance between the electrodes increases at any given arc length. This means that greater electrical power can be added to the plasma arc, at any selected arc length, so that more heat (from the added power) can be made available to the melt to accelerate the evolution of phosphorus and conversion of the chromium and vanadium into a concentrate having a reduced phosphorus content. This increased power, at any given arc length, in turn accelerates phosphorus evolution and decreases the time required for the phosphorus to be given off and accumulate in the furnace.

Of course, it is always possible to increase power to the electrodes at any time, by increasing the length of the plasma arc. However, an increased arc length is not desirable because it is wasteful of heat since the elongated arc radiates more heat along its increased length and thus does not concentrate the heat transfer into the melt as does a shorter arc. The instant mode of operation is most desirable since it permits increased power to be applied to the electrodes without undesirably increasing the arc length.

In carrying out the present invention, the plasma arc furnace has been described as preferably having an upper, water-cooled cathode and the ferrophos which serves as a lower anode. This is the preferred mode to prevent excess wear of the cathode. However, it is possible to reverse the electrode polarity but this mode will shorten the life of the upper (now, anodic) electrode.

It is also possible in the practice of the invention to utilize a plurality of electrodes in place of the single pair of electrodes utilized in the practice of the present process. The current employed herein is preferably Direct Current, but Alternating Current has been employed in the art for plasma furnaces, and can also be utilized in the present plasma arc furnace to carry out the instant process.

Excess phosphorus gas is continually removed from the furnace, quenched by spraying with water and condensed into a purified, molten phosphorus product. The phosphorus gas concentration of the furnace can be readily regulated by adjusting the flow of plasma gas and any other inert gas flowing through the furnace so that some phosphorus gas is continuously removed from the furnace but a sufficient amount of the phosphorus gas remains behind to provide for the increased voltage drop phenomenon discussed above. Alternatively, the amount of power provided to the furnace by selection of the arc length will also influence the rate at which the phosphorus is evolved and accumulates in the furnace.

After a period of about 15 to about 180 minutes, the phosphorus concentration in the ferrophos is reduced to less than about 7% by weight and a molten concentrate of metals, principally vanadium and chromium is removed contnuously, or in batch, from the furnace. Upon cooling, this molten residue becomes the metals concentrate obtained as a coproduct of the present process.

In general, the use of melt temperatures of from about 2,000° C. to about 2,700° C. and preferably, about 2,200° C. to about 2,300° C., have been found effective in the plasma furnace to reduce the phosphorus levels of the ferrophos to acceptable values. When melt temperatures higher than 2,700° C. are employed, more electrical power must be utilized to reach these higher temperatures and a substantial amount of iron is also vaporized along with the phosphorus. Since evaporation of large quantities of iron is costly and does not have any economic benefit, the use of melt temperatures higher than about 2,700° C. are feasible, but become more energy inefficient, compared with the temperature range utilized by applicants.

The elemental phosphorus recovered from the furnace is normally an especially pure product having a purity of better than 99%. This product is purer than that normally obtained from the electric furnace utilized to produce phosphorus from corresponding phosphate ore. The elemental phosphorus recovered from the ferrophos in the plasma furnace has substantially lower amounts of antimony, arsenic and cadmium values than does that which comes from the normal electric furnace used to produce elemental phosphorus. For example, applicants have found that antimony may be lower by as much as 80%, arsenic lowered by as much as 50% and cadmium substantially lowered in the phosphorus from the plasma arc furace compared with normal electric furnace prepared phosphorus. This results in a highly pure phosphorus, unobtainable by normal means, which has application in industries where such highly pure phosphorus is necessary, for example, military and electronics white phosphorus.

While the concentration of phosphorus in the residue metal concentrate of the plasma furnace is reduced to less than 7% by weight of phosphorus in normal processing, it has been possible to reduce the concentration of phosphorus to 1% by weight phosphorus or less. By carrying out the plasma furnace treatment of the ferrophos for longer periods of time, the phosphorus levels in the metal concentrates can be reduced to very low levels. The recovery of metal concentrates having phosphorus contents of about 1% to about 5% by weight is preferred. The extent to which the phosphorus content in the metals concentrate is reduced below 5% by weight is a function of how low the phosphorus level is required to be. This must be balanced with the cost of operating the plasma furnace for the longer amount of time required to reduce the phosphorus to that desired level. In general, the value of the metals concentrate increases with decreased concentrations of phosphorus.

The plasma gas utilized in the present plasma process may be any gas that is inert to phosphorus and which performs the function of the plasma gas, namely, to stabilize and maintain a continuous plasma arc in the furnace. Typical of such gases are argon, neon, helium and carbon monoxide.

The following examples are given to illustrate the invention, without intending to be limiting thereof.

EXAMPLE I

A transferred arc plasma furnace of the Tylko type, as described in U.S. Pat. No. 3,783,167 was employed. It had a water cooled cathode moveable about its longitudinal axis and a carbon container electrically connected to an anode. The plasma gas employed was a mixture of argon and helium and the current employed was direct current (DC). A feed containing 10 kgs of ferrophos was gradually fed into the furnace and accumulated in the carbon container where it became liquid and the molten feed served as the anode. The ferrophos feed had the following composition:

| Element | % (By Weight) |
| --- | --- |
| Fe | 60.2% |
| Cr | 5.0% |
| V | 6.0% |
| P | 21.8% |
| Balance | 7.0% |

The temperature of the ferrophos was raised to 2,150° C. as measured by an optical pyrometer, by increasing the power fed to the furnace and the temperature held for one hour at 2,200° C.-2,300° C. The rotating cathode caused the arc to impinge on different locations (anode spots) on the molten ferrophos. Phosphorus gas released from the ferrophos was conveyed from the furnace through a conduit to a water spray condenser and recovered as pure white phosphorus. The molten metal concentrate which remained as the residue in the carbon container was cooled, recovered and upon analysis had the following composition:

| Element | % (By Weight) |
|---------|---------------|
| Fe | 61.2% |
| Cr | 5.3% |
| V | 7.0% |
| P | 1.4% |
| C | 18.1% |
| Balance | 7.0% |

EXAMPLE II

The procedure of Example I was repeated using the same furnace and equipment, except that argon alone was employed as the plasma gas. A feed containing 6.0 kgs of ferrophos was fed to the furnace and heated to 2,100° C. as measured with an optical pyrometer. The feed had the following composition:

| Element | % (By Weight) |
|---------|---------------|
| Fe | 60.2% |
| Cr | 5.0% |
| V | 6.0% |
| P | 21.8% |
| Balance | 7.0% |

The temperature of the molten ferrophos was then increased to 2,150° C.–2,200° C. by employing 1,540 amps in the furnace, and this temperature was held for one hour.

The posphorus gas released from the ferrophos was condensed with a water spray condenser, recovered as white phosphorus, and analyzed.

The condensed white phosphorus was found to contain the following amounts of arsenic, antimony and cadmium as compared with typical white phosphorus recovered from an electric furnace that employed the same ore source.

| Impurity | Phosphorus Recovered From The Plasma Furnace (ppm) | Phosphorus From The Electric Furnace (ppm) |
|----------|-----------------------------------------------------|---------------------------------------------|
| As | 120 | 350–400 |
| Sb | 35 | 50–60 |
| Cd | 0.2 | 10–20 |

The molten metal concentrate which remains as residue in the furnace was cooled and recovered and had the following composition:

| Element | % (By Weight) |
|---------|---------------|
| Fe | 70.1% |
| Cr | 5.5% |
| V | 7.1% |
| P | 4.2% |
| C | 10.3% |
| Balance | 2.8% |

EXAMPLE III

A 2.8 kg sample of the previously treated, ferrophos concentrate recovered from Example II was further treated in the plasma furnace. The following data were taken during the final stages of phosphorus evolution from the ferrophos as additional heating was carried out in the plasma furnace. The final phosphorus concentration of the concentrate was only 0.4% by weight.

| P (% By Weight) | Time (min) | Melt Temp. °C. | Amps | Volts | Power (KW) |
|-----------------|------------|----------------|------|-------|------------|
| 4.2 | 0 | 1950 | 1500 | 100 | 150 |
| — | 41 | 2290 | 1500 | 80 | 120 |
| 0.4 | 49 | 2250 | 1500 | 75 | 112.5 |

The amperage was maintained at a constant 1,500 amps and the arc length was maintained constant (at about 17 cm). As will be observed, the voltage decreased as the amount of phosphorus being released from the ferrophos residue into the plasma decreased. Another way of saying this is that the voltage drop across the electrodes decreased as the concentration of phosphorus in the furnace (and in the plasma) decreased. This resulted in less power being able to be added to the furnace at a constant arc length.

EXAMPLE IV

A feed containing 10 kg of ferrophos of similar composition as previous Examples I and II was heated in a plasma furnace as described in Example I for about three hours at temperatures of between 1,600° C. and 2,100° C. employing argon as the plasma gas, and maintaining a constant arc length of about 17 cm. The following data was obtained during the progressive recovery of the phosphorus from the ferrophos.

| P (% By Weight) | Time (min) | Melt Temp. °C. | Amps | Volts | Power (KW) |
|-----------------|------------|----------------|------|-------|------------|
| 23.8 | 0 | 1600 | 1500 | 60 | 90 |
| 20.0 | 29 | 2000 | 1500 | 75 | 112.5 |
| 15.4 | 60 | 2100 | 1500 | 80 | 120 |
| 14.1 | 92 | 1900 | 1500 | 60 | 90 |

After 92 minutes, the temperature of the melt was increased to 2,050° C. and after 90 additional minutes, the phosphorus concentration was decreased to 2.9% using a constant 1,500 amp setting and employing a constant arc length of about 17 cm.

As will be observed from the above data, the voltage and power were observed to rise as the temperature and thus the phosphorus evolution and concentration in the furnace (and in the plasma) rose. However, when the temperature was deliberately reduced to 1,900° C., the phosphorus evolution and concentration in the plasma decreased resulting in a decrease in voltage and power. When the temperature was increased to 2,050° C., evolution of phosphorus from the melt thereafter was able to be continued until the concentrate in the furnace contained only 2.9% phosphorus.

EXAMPLE V

A transferred arc plasma furnace was constructed in which the cathode was a fixed hollow graphite electrode that did not require water-cooling and the anode was molten ferrophos contained in a graphite crucible. A small sample of 8.5 g of finely divided, previously treated ferrophos was fed into the hollow graphite electrode along with a continuous stream of argon. The sample melted and flowed into the graphite crucible where the melt served as the anode contained in the graphite crucible. The run was carried out at a temperature of about 2,070° C., as measured by optical pyrometer, for about 20 minutes and at a power rating of 3.8

KW. The plasma arc impinged on an "anode spot" of the molten ferrophos in the crucible, and a pure white phosphorus was condensed. Phosphorus removal from the feed was greater than 44%.

We claim:

1. A process for recovering elemental phosphorus and a metal concentrate from ferrophos comprising treating ferrophos in a plasma arc furnace by maintaining an electric arc between a first electrode and ferrophos which serves as a second electrode, introducing a plasma gas inert to phosphorus into the furnace to form a continuous plasma within the arc maintained between the first electrode and at least one point on the surface of the ferrophos, heating the ferrophos with a plasma arc to maintain the average temperature of the molten ferrophos at from about 2,000° C. to about 2,700° C., evolving gaseous phosphorus from the heated ferrophos, reducing the phosphorus concentration of the treated ferrophos to less than about 7% by weight, removing a purified phosphorus from the furnace as one product and recovering a metal concentrate having a reduced phosphorus content as a coproduct.

2. The process of claim 1 wherein the first electrode is a cathode and the second electrode is an anode.

3. The process of claim 2 wherein the cathode is water cooled.

4. The process of claim 2 wherein the cathode is a hollow core carbon electrode.

5. The process of claim 1 wherein the average temperature of the ferrophos is maintained at from about 2,200° C. to about 2,300° C.

6. The process of claim 1 wherein the metal concentrate contains from about 1% to about 5% by weight of phosphorus.

7. The process of claim 1 wherein the metal concentrate is rich in vanadium.

8. The process of claim 1 wherein the metal concentrate is rich in chromium.

9. The process of claim 1 wherein the plasma gas employed is argon.

10. The process of claim 1 wherein the plasma gas employed is helium.

11. The process of claim 1 wherein gas inert to phosphorus is passed into the furnace and removed along with gaseous phosphorus at a rate to maintain the phosphorus vapor concentration in the furnace sufficient to increase the voltage drop across the electrodes, at any given arc length.

12. The process of claim 1 wherein the power input to the electrodes is increased, at any given arc length, due to an increased voltage drop across the electrodes produced by the phosphorus vapor concentration in said furnace.

13. The process of claim 1 wherein the phosphorus gas removed from the furnace has reduced amounts of a metal selected from the group consisting of antimony, cadmium and arsenic compared with conventionally produced phosphorus from an electric furnace.

14. The process of claim 1 wherein the phosphorus removed from the furnace has a purity of at least 99% phosphorus.

15. The process of claim 1 wherein the first electrode is capable of movement along its own longitudinal axis to establish an electrically conductive path between the first electrode and the second electrode.

16. The process of claim 1 wherein the ferrophos is introduced through a conduit into the upper portion of the plasma arc.

17. The process of claim 1 wherein the ferrophos is introduced into a receptacle which is connected in an electrically conductive manner to the second electrode.

18. The process of claim 1 wherein the plasma arc is maintained between the first electrode and at least one point on the surface of molten ferrophos contained in a receptacle.

19. A process for recovering elemental phosphorus and a metal concentrate from ferrophos comprising treating ferrophos in a plasma arc furnace by maintaining an electric arc between a first electrode and ferrophos which serves as a second electrode, introducing a plasma gas inert to phosphorus into the furnace to form a continuous plasma within the arc maintained between the first electrode and at least one point on the surface of the ferrophos, heating the ferrophos with a plasma arc to maintain the average temperature of the molten ferrophos at from about 2,000° C. to about 2,700° C., evolving gaseous phosphorus from the heated ferrophos, maintaining the average phosphorus vapor concentration in the furnace sufficient to increase the voltage drop across the electrodes at any given arc length, reducing the phosphorus concentration of the treated ferrophos to less than about 7% by weight, removing a purified phosphorus from the furnace as one product and recovering a metal concentrate having a reduced phosphorus content as a coproduct.

20. The process of claim 19 wherein the metal concentrate contains from about 1% to about 5% by weight of phosphorus.

21. The process of claim 19 wherein the metal concentrate is rich in vanadium.

22. The process of claim 19 wherein the phosphorus removed from the furnace has reduced amounts of a metal selected from the group consisting of antimony, cadmium and arsenic compared with conventionally produced phosphorus from an electric furnace.

* * * * *